US012635663B2

(12) United States Patent
    Luo

(10) Patent No.: US 12,635,663 B2
(45) Date of Patent: May 26, 2026

(54) ELECTRIC FENCE ASSEMBLY

(71) Applicant: SHENZHEN WILTU TECHNOLOGY CO., LTD., Shenzhen (CN)

(72) Inventor: Xingsheng Luo, Shenzhen (CN)

(73) Assignee: SHENZHEN WILTU TECHNOLOGY CO., LTD., Shenzhen (CN)

( * ) Notice: Subject to any disclaimer, the term of this patent is extended or adjusted under 35 U.S.C. 154(b) by 293 days.

(21) Appl. No.: 18/493,011

(22) Filed: Oct. 24, 2023

(65) Prior Publication Data

US 2025/0072391 A1 Mar. 6, 2025

(30) Foreign Application Priority Data

Aug. 31, 2023 (CN) .......................... 202311130640.X

(51) Int. Cl.
    *A01K 3/00* (2006.01)
    *A01K 11/00* (2006.01)
    *A01K 15/02* (2006.01)
    *A01K 29/00* (2006.01)

(52) U.S. Cl.
    CPC .............. *A01K 3/00* (2013.01); *A01K 11/008* (2013.01); *A01K 15/023* (2013.01); *A01K 29/005* (2013.01)

(58) Field of Classification Search
    CPC ...... A01K 3/00; A01K 11/008; A01K 15/023; A01K 29/005
    See application file for complete search history.

(56) References Cited

U.S. PATENT DOCUMENTS

| | | | | |
|---|---|---|---|---|
| 9,848,295 | B1 * | 12/2017 | Mason | H04W 4/025 |
| 10,254,328 | B1 * | 4/2019 | Lowe | G08B 13/22 |
| 10,292,365 | B1 * | 5/2019 | Landers | A01K 15/023 |
| 10,342,218 | B1 * | 7/2019 | Landers | A01K 15/029 |
| 10,806,125 | B1 * | 10/2020 | Wu | G01C 21/20 |
| 11,044,889 | B1 * | 6/2021 | Rogers | A01K 11/008 |
| 11,684,039 | B2 * | 6/2023 | Bedell | G01S 5/0027 |
| | | | | 119/719 |

(Continued)

FOREIGN PATENT DOCUMENTS

| CN | 102318563 A | 1/2012 |
|---|---|---|
| CN | 103002729 A | 3/2013 |

(Continued)

OTHER PUBLICATIONS

First Office Action issued in counterpart Chinese Patent Application No. 202311130640.X, dated May 1, 2025.

(Continued)

*Primary Examiner* — Monica L Perry
*Assistant Examiner* — Aaron M Rodziwicz
(74) *Attorney, Agent, or Firm* — Westbridge IP LLC

(57) ABSTRACT

An electric fence assembly includes a transmitter and N receivers communicated with the transmitter. N is a positive integer. The transmitter is configured to output a fence setting signal to the N receivers according to a preset fence range, and is further configured to generate a forbidden zone range within the preset fence range in response to receiving a forbidden zone generation signal, and output a forbidden zone setting signal to the N receivers according to the forbidden zone range.

8 Claims, 5 Drawing Sheets

(56)                    References Cited

U.S. PATENT DOCUMENTS

| | | | | |
|---|---|---|---|---|
| 11,771,061 | B2 * | 10/2023 | Ehrman ................. | A01K 15/04 |
| | | | | 119/719 |
| 12,329,126 | B1 * | 6/2025 | Yuan .................... | A01K 15/022 |
| 2005/0139169 | A1 * | 6/2005 | So ........................ | A01K 15/023 |
| | | | | 119/721 |
| 2017/0372581 | A1 * | 12/2017 | Solinsky ............ | G08B 21/0269 |
| 2018/0184618 | A1 * | 7/2018 | Gotts ................... | A01K 27/009 |

FOREIGN PATENT DOCUMENTS

| | | | | | |
|---|---|---|---|---|---|
| CN | 105764332 | A | | 7/2016 | |
| CN | 105939653 | A | | 9/2016 | |
| CN | 206212981 | U | | 6/2017 | |
| CN | 207948558 | U | | 10/2018 | |
| CN | 110384051 | A | | 10/2019 | |
| CN | 111165381 | A | | 5/2020 | |
| CN | 114245710 | A | * | 3/2022 | ........... A01K 27/001 |
| CN | 114407777 | A | | 4/2022 | |
| CN | 116609748 | A | | 8/2023 | |
| CN | 118660331 | B | * | 11/2024 | ........... H04W 88/08 |
| KR | 102159319 | B1 | * | 9/2020 | ........... A01K 15/029 |
| WO | WO-2020107358 | A1 | * | 6/2020 | ............ G08B 13/12 |
| WO | WO-2024251941 | A1 | * | 12/2024 | ........... A01K 29/005 |

OTHER PUBLICATIONS

Second Office Action issued in counterpart Chinese Patent Application No. 202311130640.X, dated Jul. 15, 2025.
Refusal Decision issued in counterpart Chinese Patent Application No. 202311130640.X, dated Oct. 28, 2025.

* cited by examiner

ELECTRIC FENCE ASSEMBLY

CROSS-REFERENCE TO RELATED APPLICATIONS

This application claims priority to Chinese Patent Application No. 202311130640.X, filed on Aug. 31, 2023, the entire contents of which are incorporated herein by reference.

TECHNICAL FIELD

The present application relates to the technical field of electric fences, in particular to an electric fence assembly.

BACKGROUND

With the improvement of people's living standards, pet keeping is becoming more and more popular. However, since pets running around can cause trouble to owners, pet electronic fences are widely used to limit the range of pets. It is necessary to improve the functions of electronic fence products on the market for users to better manage and restrict the range of pets' activities.

SUMMARY

The present application mainly aims to provide an electric fence assembly, which is intended to further limit the range of activities of pets by setting up a forbidden zone.

In order to achieve the above technical objective, the present application provides an electrical fence assembly, including:

a transmitter; and

N receivers communicated with the transmitter, N being a positive integer, the transmitter is configured to output a fence setting signal to the N receivers according to a preset fence range, and the transmitter is further configured to generate a forbidden zone range within the preset fence range in response to receiving a forbidden zone generation signal, and output a forbidden zone setting signal to the N receivers according to the forbidden zone range.

In an embodiment, the transmitter includes a first control module and a first wireless communication module, and each receiver includes a second control module and a second wireless communication module; and the first wireless communication module is communicated with N second wireless communication modules, and the first control module is configured to communicated with N second control modules respectively through the first wireless communication module and the N second wireless communication modules.

In an embodiment, both the first wireless communication module and the second wireless communication module include a radar communication module.

In an embodiment, the transmitter further includes a first trigger assembly configured to output the corresponding forbidden zone generation signal to the first control module in response to being triggered; and the first control module is configured to generate the forbidden zone range within the preset fence range in response to receiving the forbidden zone generation signal, and output the forbidden zone setting signal to the N second control modules respectively through the first wireless communication module and the N second wireless communication modules according to the forbidden zone range.

In an embodiment, the first wireless communication module is configured to access an external terminal; and the first control module is configured to generate the forbidden zone range within the preset fence range in response to receiving the forbidden zone generation signal output by the external terminal, and output the forbidden zone setting signal to the N second control modules respectively through the first wireless communication module and the N second wireless communication modules according to the forbidden zone range.

In an embodiment, the receiver includes:

a position module configured to locate a position of the position module and output a corresponding position detection signal;

an alarm module; and a second control module configured to control the alarm module to work in response to determining that a position of the receiver exceeds the preset fence range or the receiver enters the forbidden zone according to the position detection signal.

In an embodiment, the position module includes an ultrawideband (UWB) radar.

In an embodiment, the alarm module includes at least one of the following modules:

a buzzer siren module configured to electrically connected to the second control module and work under a control of the second control module;

a vibration module configured to electrically connected to the second control module and work under the control of the second control module; and an electroshock module configured to electrically connected to the second control module and work under the control of the second control module.

In an embodiment, the transmitter further includes a second trigger assembly configured to electrically connected to the first control module and output a second trigger signal in response to being triggered by users;

the first control module is configured to output a mode setting signal through the first wireless communication module in response to receiving the second trigger signal; and the second control module is configured to receive the mode setting signal through the second wireless communication module, and control at least one of the buzzer siren module, the vibration module and the electroshock module to work according to the mode setting signal.

In an embodiment, the receiver includes:

a plurality of alarm modules; and a time counting module electrically connected to the second control module;

the second control module is configured to control one of the plurality of alarm modules to work according to a preset time.

The electric fence assembly proposed in the present application includes a transmitter and N receivers communicated with the transmitter. N is a positive integer. The transmitter is configured to output a fence setting signal to the N receivers according to a preset fence range, and is further configured to generate a forbidden zone range within the preset fence range in response to receiving a forbidden zone generation signal, and output a forbidden zone setting signal to the N receivers according to the forbidden zone range.

In practical applications, users can use the transmitter to set the electronic fence range and set the forbidden zone range within the preset fence range. The transmitter outputs the corresponding fence setting signal and the forbidden zone setting signal to the receiver. The user can set the electronic fence range and the forbidden zone range through the trigger assembly of the transmitter, or input the electronic fence range and the forbidden zone range through an external terminal that establishes a communication connection with the transmitter. By setting the electronic fence assembly, a forbidden zone is set within the preset electronic fence range to further restrict the range of pets' activities within the electronic fence. For example, the user can set the electronic fence range around the house and set the area of the house as the forbidden zone. Such that pets can neither escape from the electronic fence nor enter the room, thereby avoiding damaging valuable items in the room. In this way, the functional diversity of electronic fence products is improved.

BRIEF DESCRIPTION OF THE DRAWINGS

In order to more clearly illustrate the technical solutions in the embodiments of the present application or in the related art, drawings in the embodiments or in the related art will be briefly described below. Obviously, the drawings in the following description are only some embodiments of the present application. Other drawings can be obtained by those skilled in the art according to the structures shown in the drawings without creative efforts.

Figure 1:
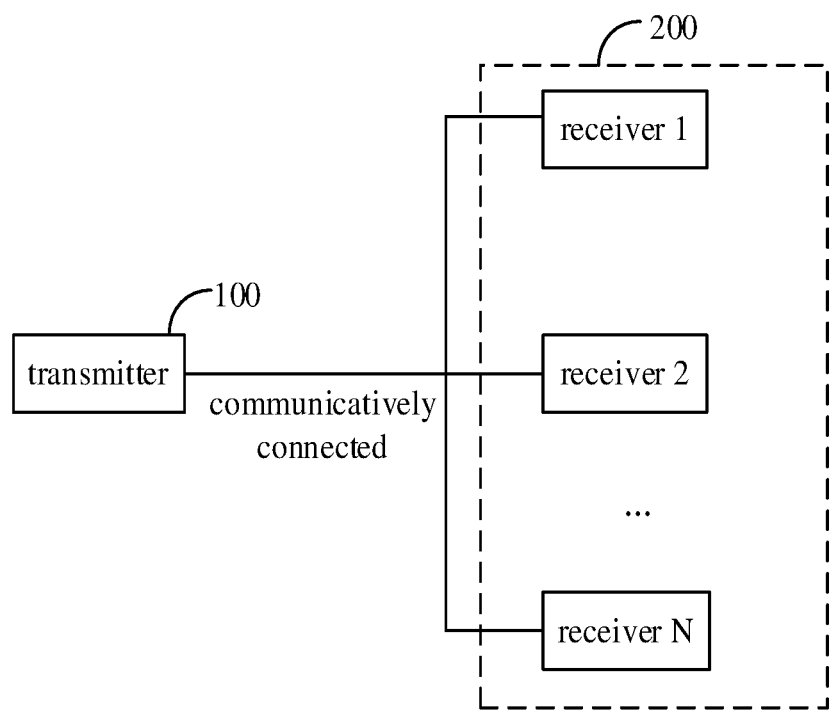
FIG. 1 is a schematic diagram of a circuit module of an electronic fence assembly according to an embodiment of the present application.

The realization of the purpose, functional characteristics and advantages of the present application will be further described with reference to the attached drawings in combination with embodiments.

DETAILED DESCRIPTION OF THE EMBODIMENTS

The technical solutions of embodiments of the present application will be clearly and completely described with reference to the drawings of the present application. Obviously, the described embodiments are only some rather than all of the embodiments of the present application. Based on the embodiments of the present application, all other embodiments obtained by those skilled in the art without creative efforts shall fall within the scope of the present application.

It should be noted that all directional indicators (such as up, down, left, right, front, rear, etc.) in the embodiments of the present application are only used to explain the relative positional relationship, movement situation, etc. among components in a specific attitude (as shown in the drawings). If the specific attitude changes, the directional indication also changes accordingly.

With the improvement of people's living standards, pet keeping is becoming more and more popular. However, since pets running around can cause trouble to owners, pet electronic fences are widely used to limit the range of pets. It is necessary to improve the functions of electronic fence products on the market for users to better manage and restrict the range of pets' activities.

Therefore, the present application proposes an electronic fence assembly. Referring to FIG. 1, the electronic fence assembly includes a transmitter 100 and N receivers 200 communicated with the transmitter 100. N is a positive integer.

The transmitter 100 is configured to output a fence setting signal to the N receivers 200 according to a preset fence range.

The transmitter 100 is further configured to generate a forbidden zone range within the preset fence range in response to receiving a forbidden zone generation signal, and output a forbidden zone setting signal to the N receivers 200 according to the forbidden zone range.

In this embodiment, the transmitter 100 can be an infrared transmitter, a bluetooth transmitter or a radar transmitter, and the receiver 200 can be an infrared receiver, a bluetooth receiver or a radar receiver.

It should be noted that the transmitter 100 and each of the N receivers 200 include a communication module to establish a communication connection between the transmitter 100 and the N receivers 200. The communication module can be a wired communication module, such as a local interconnect network (LIN) communication module, a controller area network (CAN) communication module, a RS485 transceiver chip, etc. The corresponding bus type is selected according to the communication module. The communication module can also be a wireless communication module, such as a wireless fidelity (WiFi) module, a bluetooth communication module 40, a 4G/5G module, etc. Moreover, the communication module of the transmitter 100 and the communication module of the receiver 200 are of the same type.

In an embodiment, when the user uses the electronic fence assembly of the present application, the transmitter 100 can establish communication connections with the N receivers 200 at the same time, so that the transmitter 100 outputs a corresponding fence setting signal to at least one of the N receivers 200 according to the preset fence range, thereby establishing an electronic fence to limit the activity range of the pet wearing the receiver 200. In addition, the transmitter 100 can also set a forbidden zone within the preset fence range in response to receiving the forbidden zone generation signal, and output the corresponding forbidden zone setting signal to at least one of the N receivers 200, so that the pet wearing the receiver 200 that receives the forbidden zone setting signal cannot enter the forbidden zone, thereby further limiting the pet's activity range. In this way, setting up a forbidden zone within the electronic fence specified by the pet owner can prevent pets from causing trouble to the owner after entering the forbidden zone. For example, if the pet owner sets up an electronic fence around the house and sets the area of the house as a forbidden zone, pets can neither run out of the electronic fence, nor enter the room to avoid damaging the valuables in the room. In this way, the functional diversity of electronic fence products is improved.

The present application proposes an electronic fence assembly, which includes a transmitter 100 and N receivers 200. The N receivers 200 are communicated with the transmitter 100, and N is a positive integer. The transmitter 100 is configured to output a fence setting signal to the N receivers 200 according to a preset fence range. The transmitter 100 is further configured to generate a forbidden zone range within the preset fence range in response to receiving a forbidden zone generation signal, and output a forbidden zone setting signal to the N receivers 200 according to the forbidden zone range.

In practical applications, users can use the transmitter 100 to set the electronic fence range and set the forbidden zone range within the preset fence range. The transmitter 100 outputs the corresponding fence setting signal and the forbidden zone setting signal to the receiver 200. The user can set the electronic fence range and the forbidden zone range through the trigger assembly of the transmitter 100, or input the electronic fence range and the forbidden zone range through an external terminal that establishes a communication connection with the transmitter 100. By setting the electronic fence assembly, a forbidden zone is set within the preset electronic fence range to further restrict the range of pets' activities within the electronic fence. For example, the user can set the electronic fence range around the house and set the area of the house as the forbidden zone. Such that pets can neither escape from the electronic fence nor enter the room, thereby avoiding damaging valuable items in the room. In this way, the functional diversity of electronic fence products is improved.

Figure 2:
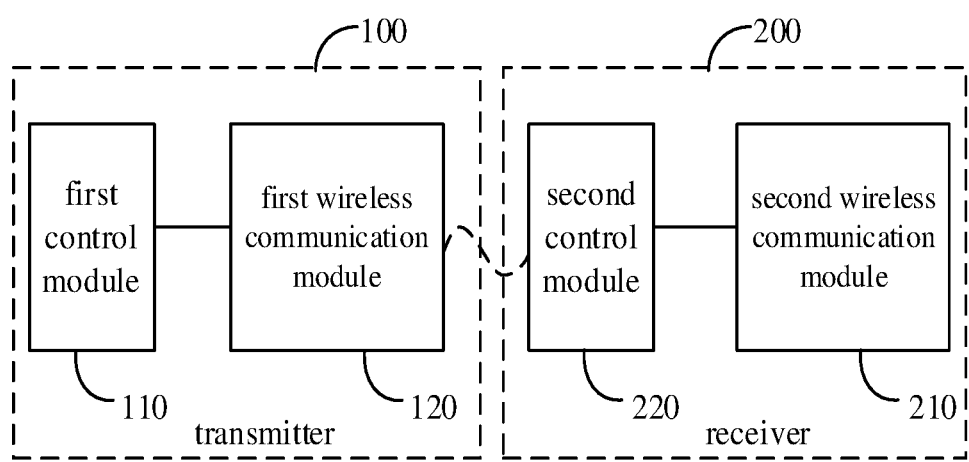
FIG. 2 is a schematic diagram of a circuit module of an electronic fence assembly according to another embodiment of the present application.

In an embodiment of the present application, referring to FIG. 2, the transmitter 100 includes a first control module 110 and a first wireless communication module 120; and the receiver 200 includes a second control module 210 and a second wireless communication module 220.

The first wireless communication module 120 is communicated with N second wireless communication modules 220. The first control module 110 is configured to communicate with N second control modules 210 respectively through the first wireless communication module 120 and the N second wireless communication modules 220.

In this embodiment, both the first control module 110 and the second control module 210 can be a main controller, such as a microcontroller unit (MCU), a digital signal process (DSP) chip, a field programmable gate array (FPGA) chip, a logic gate array chip (PLC), a system on chip (SOC), etc. Both the first wireless communication module 120 and the second wireless communication module 220 can be a radar communication module, a WiFi module, a bluetooth communication module 40, a 4G/5G module, etc. The first wireless communication module 120 and the second wireless communication module 220 are of the same communication module type.

The first wireless communication module 120 and the second wireless communication module 220 both adopt a radar communication module as an example for explanation. In an embodiment, when the user uses the electronic fence assembly of the present application, in response to that the first control module 110 receives an external trigger signal, the radar communication module of the transmitter 100 will be controlled to work, so that the transmitter 100 establishes communication connections with multiple receivers 200 through the radar communication module of the transmitter 100 and the radar communication modules in the multiple receivers 200 to output corresponding fence setting signals to one of the N receivers 200. The second control module 210 in the receiver 200 controls the operation of the radar communication module in the receiver 200 to receive the fence setting signal after establishing a communication connection with the transmitter 100. In this way, pets wearing the receivers 200 can move freely within the set electronic fence, that is, pets cannot exceed the preset fence range. In response to that the transmitter 100 receives the forbidden zone generation signal, the transmitter 100 will output the forbidden zone setting signal to at least one of the N receivers 200 through the radar communication module, so that pets wearing the receiver 200 cannot exceed the fence range and cannot enter the forbidden zone.

It should be noted that the transmitter 100 can establish communication connections with multiple receivers 200 at the same time, that is, it can manage one or more pets wearing the receiver 200 to limit their range of activities. In addition, both the trigger signal and the forbidden zone generation signal may be signals triggered by the user through corresponding trigger assemblies of the transmitter 100, or may be signals output by an external terminal communicated with the transmitter 100.

Through the above settings, the transmitter 100 can establish a communication connection with at least one of the N receivers 200, thereby limiting the activity range of the pets wearing the receiver 200 and facilitating the owner's control of the pets. Moreover, compared with wired communication modules, wireless communication modules are suitable for long-distance communication, have a wide transmission range, are easy to carry and move, and have high flexibility. The radar communication module can realize a high-speed signal transmission process between the transmitter 100 and the receiver 200, thus improving the response speed of the receiver 200.

Figure 3:
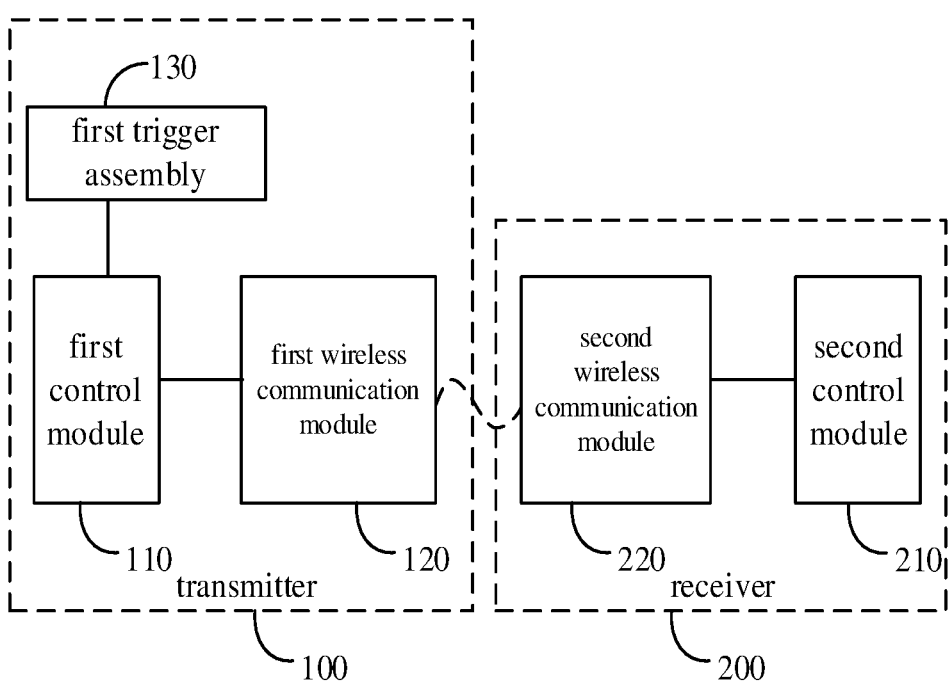
FIG. 3 is a schematic diagram of a circuit module of an electronic fence assembly according to yet another embodiment of the present application.

In some embodiments of the present application, referring to FIG. 3, the transmitter 100 further includes a first trigger assembly 130 configured to output a corresponding forbidden zone generation signal to the first control module 110 in response to being triggered.

The first control module 110 is configured to, in response to receiving the forbidden zone generation signal, generate a corresponding forbidden zone range within the preset fence range, and output the corresponding forbidden zone setting signal to the N second control modules 210 respectively through the first wireless communication module 120 and the N second wireless communication modules 220 according to the forbidden zone range.

In this embodiment, the first trigger assembly 130 can be a physical button or a virtual button.

In an embodiment, taking the first trigger assembly 130 as a physical button as an example for illustration, two physical buttons can be set on the transmitter 100, namely a plus key and a minus key. The user can set the forbidden range by pressing the plus key or minus key. After triggering the first trigger assembly 130, the transmitter 100 outputs the corresponding forbidden zone generation signal. After receiving the forbidden zone generation signal, the first control module 110 generates a forbidden zone range within the preset fence range, and outputs the corresponding forbidden zone setting signal through the first wireless communication module 120 to the receiver 200 that is communicated with the transmitter 100, so that the second control module 210 of the receiver 200 works after receiving the forbidden zone setting signal through the second wireless communication module 220. For example, the receiver 200 can be provided with a position module 230 and an alarm module. In response to that the position information output by the position module 230 indicates that the pets wearing the receiver 200 exceeds the preset fence range or enters the set forbidden zone, the second control module 210 controls the alarm module to work according to the received position information. It can warn the pet and prevent it from entering the forbidden zone or beyond the fence range to make the pets return to the safe range set by the owner. The setting of the first trigger assembly 130 enables the user to adjust the electronic fence range and the forbidden zone according to actual needs, which improves the user's convenience. Moreover, the first trigger assembly 130 can adopt a physical button to present it in a more intuitive manner. Since the physical button is usually composed of elastic elements and mechanical structures, the button feedback is clear and accidental touch operations are avoided.

Figure 5:
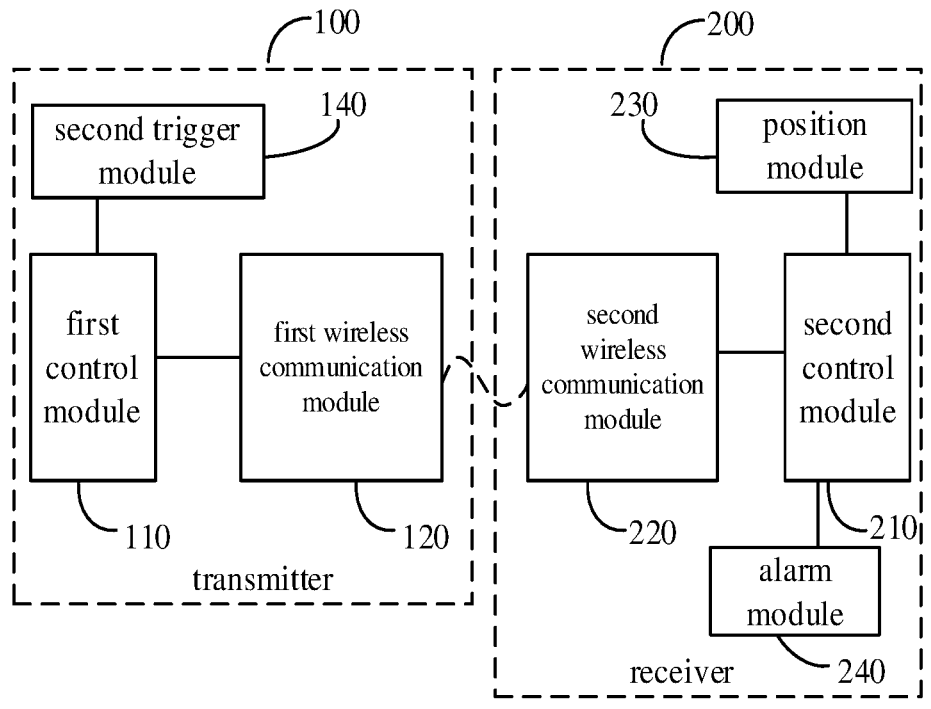
FIG. 5 is a schematic diagram of a circuit module of an electronic fence assembly according to an embodiment of the present application.
Figure 6:
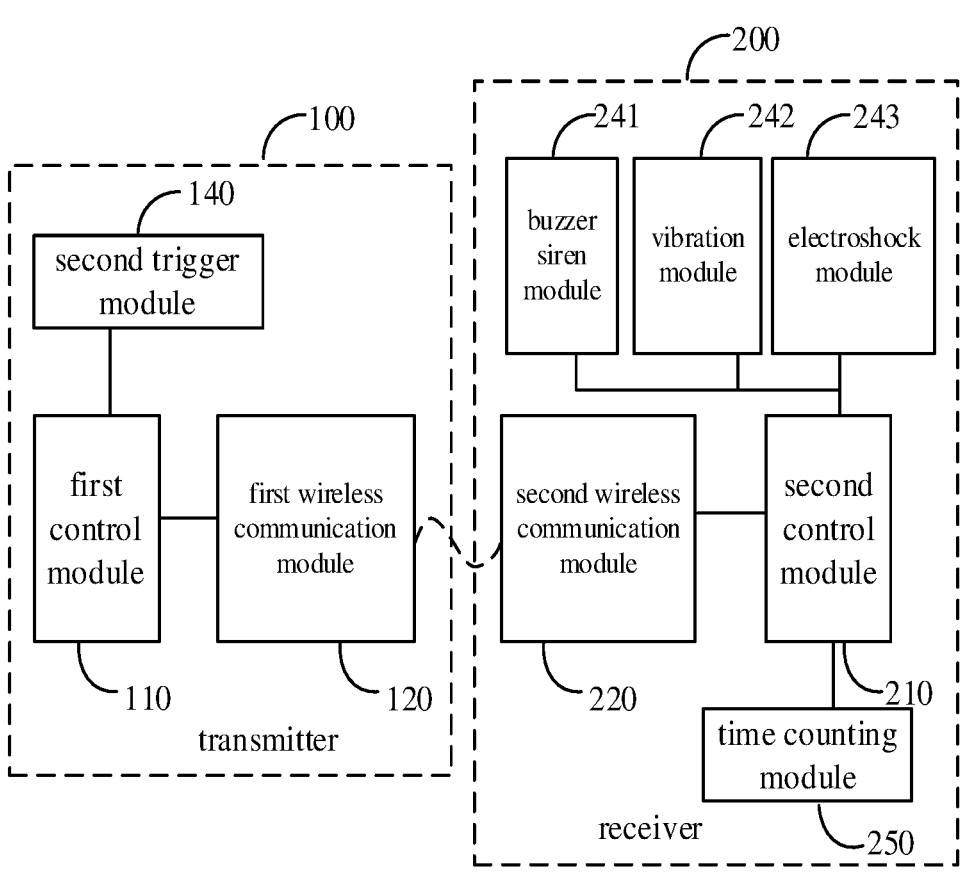
FIG. 6 is a schematic diagram of a circuit module of an electronic fence assembly according to another embodiment of the present application.

In some embodiments of the present application, referring to FIGS. 5 and 6, the receiver 200 includes a position module 230, an alarm module 240 and a second control module 210.

The position module 230 is configured to locate a position of the position module and output a corresponding position detection signal.

The second control module 210 is configured to control the alarm module 240 to work in response to determining that a position of the receiver 200 exceeds the preset fence range or the receiver 200 enters the forbidden zone according to the position detection signal.

The alarm module 240 includes at least one of the following modules: a buzzer siren module 241, a vibration module 242 and an electroshock module 243.

The buzzer siren module 241 is configured to electrically connected to the second control module 210 and work under a control of the second control module 210.

The vibration module 242 is configured to electrically connected to the second control module 210 and work under the control of the second control module 210.

The electroshock module 243 is configured to electrically connected to the second control module 210 and work under the control of the second control module 210.

The transmitter 100 also includes a second trigger assembly 140 configured to electrically connected to the first control module 110 and output a second trigger signal in response to being triggered by users.

The first control module 110 is configured to output a mode setting signal through the first wireless communication module 120 in response to receiving the second trigger signal.

The second control module 210 is configured to receive the mode setting signal through the second wireless communication module 220, and control at least one of the buzzer siren module 241, the vibration module 242 and the electroshock module 243 to work according to the mode setting signal.

In this embodiment, the position module 230 can be a global positioning system (GPS) module, a Beidou module, a radar position module, an inertial navigation module, etc. The buzzer siren module 241 can be a piezoelectric buzzer or a magnetic buzzer. The vibration module 242 can be a rotor motor, a linear motor, etc. The electroshock module 243 can be a high voltage generator composed of a pulse generator, a driver and a high voltage transformer. The second trigger assembly 140 can be a physical button or a virtual button.

Combined with the content of the above embodiments, in response to that the position module 230 in the receiver 200 outputs the position detection signal representing the current position of the pets to the second control module 210, and the second control module 210 determines that the current position is beyond the preset fence range or within the forbidden zone range, at least one of the buzzer siren module 241, the vibration module 242 and the electroshock module 243 is controlled to work. In addition, the user can set a warning mode through the second trigger assembly 140, and the second trigger assembly 140 includes trigger buttons corresponding to the buzzer siren module 241, the vibration module 242, and the electroshock module 243. The user can set the warning mode by triggering the second trigger assembly 140 on the transmitter 100 in advance to make at least one of the buzzer siren module 241, the vibration module 242 and the electroshock module 243 to work when the pets wearing the receiver 200 exceed the fence range or enter the forbidden zone. For example, the user wants to set the warning mode to the vibration mode, only the vibration trigger button corresponding to the vibration module 242 on the transmitter 100 needs to be triggered. When receiving the vibration trigger signal corresponding to the vibration trigger button, the first control module 110 outputs the corresponding mode setting signal through the first wireless communication module 120. When receiving the mode setting signal through the second wireless communication module 220, the second control module 210 controls the vibration module 242 to work, so that when the pets exceed the preset fence range or enter a forbidden zone within the fence range to warm the pets by vibration. In addition, the user can also preset a warning method for the pets according to the age or personality of the pets. If the pet is young, the user can trigger the corresponding trigger button of the buzzer siren module 241 in advance to warm the pet only through sound when the pet exceeding the fence range or entering the forbidden zone. If the pet is not docile, the trigger button corresponding to the electroshock module on the transmitter 100 can be triggered in advance, so that when the pet exceeds the fence range or enters the forbidden zone, a safe electric shock is given to make the pet return to the fence range or leave the forbidden zone.

Figure 7:
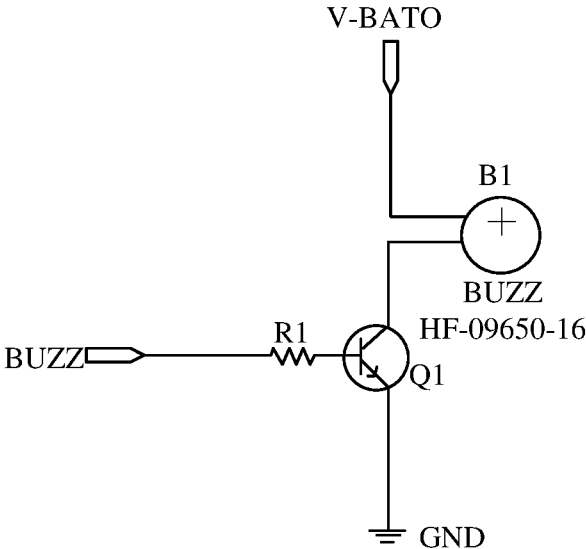
FIG. 7 is a specific circuit diagram of a buzzer siren module in an electronic fence assembly according to an embodiment of the present application.
Figure 8:
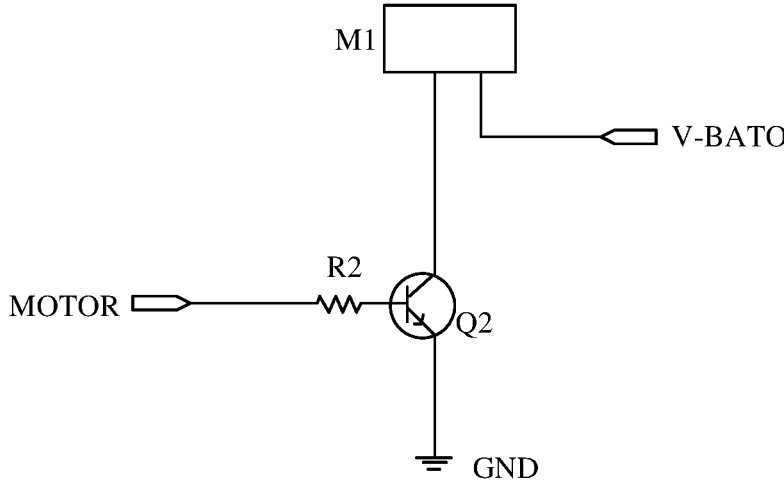
FIG. 8 is a specific circuit diagram of a vibration module in an electronic fence assembly according to an embodiment of the present application.
Figure 9:
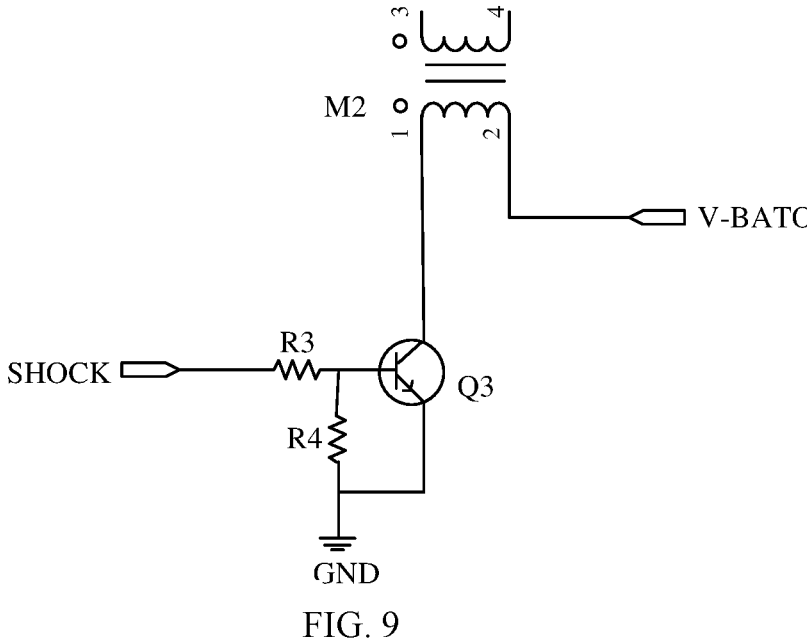
FIG. 9 is a specific circuit diagram of an electroshock module in an electronic fence assembly according to an embodiment of the present application.

In an embodiment, referring to FIG. 7 to FIG. 9, when the second control module 210 determines that the pet exceeds the preset fence range or enters the forbidden zone according to the position detection signal, if the warning method set by the user in advance is a sound warning, the second control module 210 will output a control signal to the BUZZ signal terminal of the buzzer siren module 241, so that the switch circuit Q1 in the buzzer siren module 241 is turned on, and the power supply terminal V-BATO of the buzzer siren module 241 is powered, and then the buzzer B1 can make a sound. If the warning mode set by the user in advance is vibration warning, the second control module 210 will output the corresponding control signal to the MOTOR signal terminal of the vibration module 242 to control the switch circuit Q2 to conduct, and the power supply terminal V-BATO of the vibration module 242 is powered, which in turn causes the vibration motor M1 to vibrate. Similarly, when the warning mode is electric shock warning, the second control module 210 will output the corresponding control signal to the SHOCK signal terminal of the electroshock module 243, and then control the switch circuit Q3 to conduct, so that the transformer M2 starts to work. The power supply terminal V-BATO of the electroshock module 243 is powered, the output pin 3 and output pin 4 of the transformer will output the preset voltage after boosting to achieve the purpose of electric shock. It is understandable that the preset voltage can be set by the developer in advance so that when the preset voltage is output for electric shock, the pet will not be harmed and the pet will only be warned by the electric shock.

Through the above settings, users can choose any warning method to warn the pet, which improves user convenience.

It should be noted that, in order to prevent the pet from triggering the alarm module 240 to warn the pet when the pet does not exceed the set boundary of the electronic fence or enter the boundary of the forbidden zone due to inaccurate positioning. Therefore, the position module 230 in this embodiment can be a ultra-wideband (UWB) radar to achieve centimeter-level precise positioning of the pet wearing the receiver through UWB radar ranging and positioning technology, thereby ensuring the effectiveness of the electronic fence boundary and forbidden zone boundary set by the user, which prevents the alarm module 240 from being accidentally triggered due to inaccurate positioning, and can avoid unnecessary harm to the pet to a certain extent. In addition, UWB positioning technology has low transmit power and wide signal bandwidth, and can be well hidden among other types of signals and environmental noise. Traditional receivers cannot identify and receive them, and by using a spread spectrum code pulse sequence consistent with the transmitter, demodulation can be carried out, so it will not cause interference to other communication positioning, and it can also avoid interference from other communication devices, thereby improving the anti-interference of the positioning signal, and further improving the positioning accuracy of the electronic fence assembly of the present application. Compared with satellite positioning, there will be no problem of inaccurate positioning due to signal instability, and high-precision positioning can also be achieved indoors. That is, the electronic fence assembly of the present application can be applied to indoor and outdoor scenes, improving the practicality and scope of the electronic fence assembly in the present application.

Figure 4:
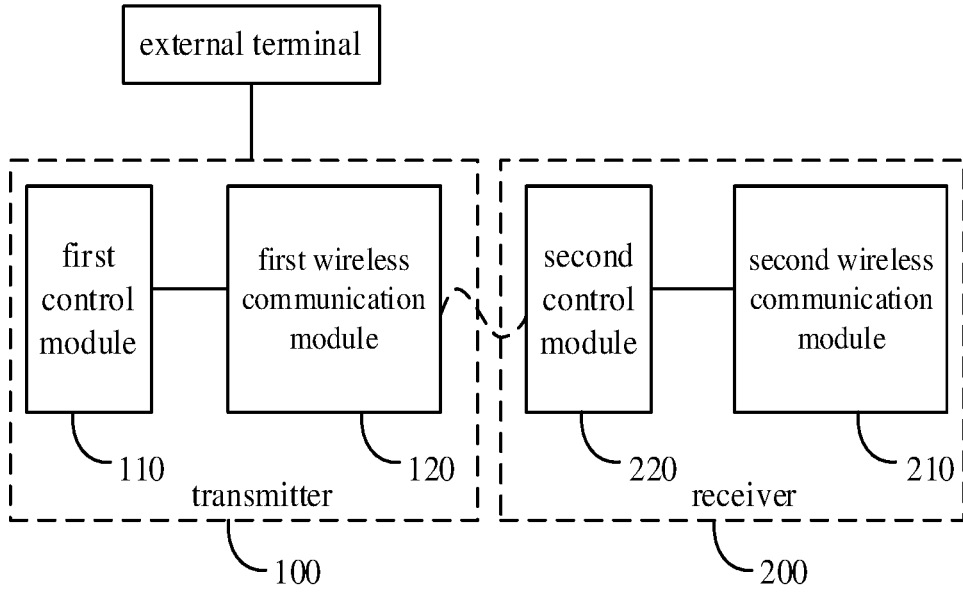
FIG. 4 is a schematic diagram of a circuit module of an electronic fence assembly according to still another embodiment of the present application.

It can be understood that, referring to FIG. 4, the first wireless communication module 120 is configured to access an external terminal.

The first control module 110 is configured to generate the forbidden zone range within the preset fence range in response to receiving the forbidden zone generation signal output by the external terminal, and output the forbidden zone setting signal to the N second control modules 210 respectively through the first wireless communication module 120 and the N second wireless communication modules 220 according to the forbidden zone range.

The second control module 210 is also configured to send the position detection signal to the first control module 110 through the second wireless communication module 220 and the first wireless communication module 120.

In this embodiment, the external terminal can be a mobile phone, tablet, computer, etc.

In an embodiment, the user can establish a communication connection between the transmitter 100 and an external terminal through the first wireless communication module 120. In this way, the user can download relevant application software on the external terminal, and directly enter the application software when he or she needs to use the electronic fence assembly of the present application to set the forbidden zone range and output the corresponding forbidden zone generation signal to the first control module 110. The first control module 110 sets the forbidden zone range according to the received forbidden zone generation signal, and outputs the corresponding forbidden zone setting signal to the second control module 210 in the receiver 200, so that the second control module 210 detects the position according to the position detection signal output by the position module 230 to determine whether the pet enters the forbidden zone. If the pet enters the forbidden zone, the alarm module 240 is controlled to work. The application software can be software developed by R&D personnel to be used in conjunction with electronic fence products. It should be noted that the second control module 210 is also configured to send the position detection signal to the first control module 110 through the second wireless communication module 220 and the first wireless communication module 120. In this way, the first control module 110 is used to send the received position detection signal to the external terminal through the first wireless communication module 120, so that the user can directly obtain the current pet's location information through the external terminal. Or a display module electrically connected to the first control module 110 can be provided on the transmitter 100 and the display module can be implemented by using a display screen and a corresponding drive module, such as an LCD screen and an LCD screen drive module, an LED screen and an LED screen drive module, an OLED screens and an OLED screen driver module, etc. The first control module 110 controls the display module to display the current position information of the receiver 200 according to the position detection signal, so that the user can accurately know the current location of the pet.

Through the above settings, the user can set the fence range and the forbidden zone range within the fence range through the forbidden zone generation signal and the fence generation signal output by the external terminal, and can directly obtain the pet's current position information on the external terminal to facilitate pet management. In this way, the convenience of the electronic fence assembly of the present application is improved.

In some embodiments of the present application, referring to FIG. 6, there are multiple alarm modules 240, and the receiver 200 further includes a time counting module 250 electrically connected to the second control module 210.

The second control module 210 is configured to control one of the plurality of alarm modules 240 to work according to a preset time.

In this embodiment, the time counting module 250 can be a clock chip or a controller.

In an embodiment, combined with the content of the above embodiments, when the pet wearing the receiver 200 exceeds the fence range or enters the forbidden zone, that is, the second control module 210 in the receiver 200 determines that the position of the receiver 200 exceeds the fence range or the receiver enters the forbidden zone based on the position detection signal output by the position module 230, the control alarm module 240 starts to work, and at the same time, the control time counting module 250 starts timing. Optionally, it can be configured that when the pet exceeds the fence range or enters the forbidden zone, the second control module 210 controls the buzzer siren module 241 to issue a sound prompt, and if the pet has not returned to the fence range or left the forbidden zone within a preset time, the second control module 210 controls the vibration module 242 to vibrate according to the timing result output by the time counting module 250. Similarly, if the pet does not move correctly to the correct safe position within the preset time of the vibration module 242, the second control module 210 will control the electroshock module 243 to perform electric shock to warn the pet. Optionally, the buzzer siren module 241, the vibration module 242 and the electroshock module 243 can all set intensity levels. When the pet exceeds the fence range or enters the forbidden zone, the second control module 210 controls the buzzer siren module 241 to set the lowest intensity level. A sound prompt is made, and the level of the sound prompt is sequentially strengthened within a preset time. If the buzzer siren module 241 warns the pet at the highest intensity level, but the pet still does not return to the safe range set by the user, then the second control module 210 controls the vibration module 242 to provide a vibration warning at the lowest level until the pet returns to a safe range. The preset time is set in advance by the R&D personnel. In this way, gradually strengthening the pet's warning level within the preset time can increase the pet's awareness of wrong behavior, which is more conducive to the owner's management and restraint of the pet, and improves the practicality of the electronic fence assembly of the present application.

The above are only some embodiments of the present application, and the scope of the present application is not limited to this. Any modifications or replacements that can easily be thought of by those skilled in the art based on the disclosure of the present application should be included in the scope of the present application.

What is claimed is:

1. An electric fence assembly, comprising:
a transmitter; and
N receivers communicated with the transmitter, N being a positive integer,
wherein the transmitter is configured to output a fence setting signal to the N receivers according to a preset fence range, and the transmitter is further configured to generate a forbidden zone range within the preset fence range in response to receiving a forbidden zone generation signal, and output a forbidden zone setting signal to the N receivers according to the forbidden zone range;
the transmitter comprises a first control module and a first wireless communication module, and each receiver comprises a second control module and a second wireless communication module; and
the first wireless communication module is communicated with N second wireless communication modules, and the first control module is configured to communicate with N second control modules respectively through the first wireless communication module and the N second wireless communication modules;
wherein the receiver comprises:
a position module configured to locate a position of the position module and output a corresponding position detection signal;
an alarm module; and
a second control module configured to control the alarm module to work in response to determining that a position of the receiver exceeds the preset fence range or the receiver enters the forbidden zone according to the position detection signal.

2. The electric fence assembly according to claim 1, wherein both the first wireless communication module and the second wireless communication module comprise a radar communication module.

3. The electric fence assembly according to claim 1, wherein:

the transmitter further comprises a first trigger assembly configured to output the corresponding forbidden zone generation signal to the first control module in response to being triggered; and
the first control module is configured to generate the forbidden zone range within the preset fence range in response to receiving the forbidden zone generation signal, and output the forbidden zone setting signal to the N second control modules respectively through the first wireless communication module and the N second wireless communication modules according to the forbidden zone range.

4. The electric fence assembly according to claim 1, wherein:
the first wireless communication module is configured to access an external terminal; and
the first control module is configured to generate the forbidden zone range within the preset fence range in response to receiving the forbidden zone generation signal output by the external terminal, and output the forbidden zone setting signal to the N second control modules respectively through the first wireless communication module and the N second wireless communication modules according to the forbidden zone range.

5. The electric fence assembly according to claim 1, wherein the position module comprises an ultra-wideband (UWB) radar.

6. The electric fence assembly according to claim 1, wherein the alarm module comprises at least one of the following modules:
a buzzer siren module configured to electrically connected to the second control module and work under a control of the second control module;
a vibration module configured to electrically connected to the second control module and work under the control of the second control module; and
an electroshock module configured to electrically connected to the second control module and work under the control of the second control module.

7. The electric fence assembly according to claim 6, wherein:
the transmitter further comprises a second trigger assembly configured to electrically connected to the first control module and output a second trigger signal in response to being triggered by users;
the first control module is configured to output a mode setting signal through the first wireless communication module in response to receiving the second trigger signal; and
the second control module is configured to receive the mode setting signal through the second wireless communication module, and control at least one of the buzzer siren module, the vibration module and the electroshock module to work according to the mode setting signal.

8. The electric fence assembly according to claim 1, wherein the receiver comprises:
a plurality of alarm modules; and
a time counting module electrically connected to the second control module;
wherein the second control module is configured to control one of the plurality of alarm modules to work according to a preset time.

* * * * *